United States Patent [19]
Bednar

[11] Patent Number: 5,521,840
[45] Date of Patent: May 28, 1996

[54] DIAGNOSTIC SYSTEM RESPONSIVE TO LEARNED AUDIO SIGNATURES

[75] Inventor: Fred H. Bednar, Pittsburgh, Pa.

[73] Assignee: Westinghouse Electric Corporation, Pittsburgh, Pa.

[21] Appl. No.: 224,467

[22] Filed: Apr. 7, 1994

[51] Int. Cl.[6] .................................................. E03B 7/07
[52] U.S. Cl. ........................ 364/508; 395/914; 395/2.41; 137/551; 137/554
[58] Field of Search .................................. 364/506, 507, 364/508, 510, 550, 575, 581; 395/914, 915, 2.41, 21, 23, 24; 137/551, 554

[56] References Cited

U.S. PATENT DOCUMENTS

| | | | |
|---|---|---|---|
| 5,010,512 | 4/1991 | Hartstein et al. | 364/807 |
| 5,095,443 | 3/1992 | Watanabe | 395/11 |
| 5,103,496 | 4/1992 | Andes et al. | 395/24 |
| 5,109,351 | 4/1992 | Simar, Jr. | 364/513 |
| 5,416,724 | 5/1995 | Savic | 364/510 |

*Primary Examiner*—Edward R. Cosimano
*Assistant Examiner*—Edward Pipala
*Attorney, Agent, or Firm*—J. C. Spadacene

[57] ABSTRACT

Loose parts are sensed moving in a conduit carrying a flowing material, such as the cooling circuit of a pressurized water nuclear reactor. An acoustic pickup produces an electrical signal with vibration of the conduit due to impact of the loose part, and background noise. A signal processor encodes the values of distinct parameters of the electrical signal such as amplitude, amplitude at particular frequencies, etc., in an ongoing manner, producing discrete output values. These outputs are coupled as inputs to a neural network with physical or logical neuron cells loaded with weighting factors affecting the strength and polarity of neural interconnections. The factors represent the acoustic signature of the loose part. Products of the input values and the weighting factors are summed to produce one or more neural network outputs, compared to a threshold. The sum normally varies randomly, but has a strong swing when the pattern is encountered, due to the factors emphasizing the pattern over background noise. The threshold comparison operates a display or alarm. The weighting factors are learned by repeating empirical tests and correlating the factors to the signal to minimize error.

12 Claims, 5 Drawing Sheets

DIAGNOSTIC SYSTEM RESPONSIVE TO LEARNED AUDIO SIGNATURES

BACKGROUND OF THE INVENTION

1. Field of the Invention

The invention relates to discriminating automatically for sounds characteristic of a detached part moving in the coolant circuit of an operational pressurized water nuclear reactor or the like, and in particular to a system including a neural network arrangement operable to learn a characteristic signature representing a detached part, and thereafter to discern the occurrence of that signature in operational plant background noise.

2. Prior Art

It is possible to detect loose metallic debris moving through a conduit of a reactor cooling system by sensing the sound the debris makes when impacting against the conduit walls. Over time, loose debris can erode conduits or accumulate in places that cause operational problems. If the debris includes particles of nuclear fuel, accumulations can cause localized heating and emission of radiation. Even if the debris is innocuous metal such as a detached steel nut or bolt, there is a possibility that the debris could become lodged to block proper operation of a mechanical system such as a valve, or could impact against an exposed part, with consequential damage and perhaps the detachment of additional debris. The very powerful flow of coolant through the system tends to drive such debris along with considerable momentum, and it is desirable to monitor for the existence of loose debris such that appropriate corrective action can be taken.

A system for detecting loose debris can be provided by operatively arranging an acoustic sensor, amplifier and threshold detector to monitor the sounds emitted by members of the coolant conduit, especially at angles in the flow path where the momentum of the heavier metallic debris items tends to impel the debris against the conduit wall, or against an obstruction. Such a system would rely on increased amplitude of acoustic emission anywhere within the frequency response range of the sensor and amplifier, and thus could not distinguish between loose parts noises and operational noises such as the background noise of the conduit system in normal operation. Background noises such as the hum of turbulent flow, creaking or snapping noises due to displacement of conduits relative to their supports with thermal expansion, and similar normal noises, cannot readily be distinguished using such a sensing system.

There are known means for improving the discrimination of threshold detection systems. For example, the threshold at which the detector is triggered can be varied to reflect changes in background noise, i.e., triggering only on sounds louder than the present average background level to reduce the instance of erroneous triggering. This has the adverse effect of reducing the likelihood that the noise produced by a loose part will be detected.

A loose part in the coolant flow may produce sounds other than sharp sounds produced by direct .impacts. For example, a loose part may produce a low amplitude sound by scraping along a straight section of conduit, or may affect the sound of the coolant flow by changing the cross section of the conduit at a restriction. Of course, a threshold detection system is unlikely to respond to low amplitude sounds of this kind.

SUMMARY OF THE INVENTION

The present invention monitors the sound emitted by the coolant circuit for particular audio signatures. The signatures can represent the impact of loose parts. Impacts have characteristic ringing signatures for particular types and sizes of debris, generally defining a periodic wave at a characteristic frequency or frequencies, rising suddenly in amplitude upon occurrence of the impact and falling back to the background level substantially exponentially. Scraping sounds and other forms of impact or frictional noise also have signatures, being distinct for example due to the occurrence of particular signal parameters over a certain period of time. According to the invention, such signatures are learned empirically, i.e., stored as distinguishing parameters in a decision tree arrangement in a neural network. By monitoring for the occurrence of these distinguishing parameters in an ongoing manner during plant operation, it is possible more accurately to discern the pattern in background noise. Although the background noise may be higher in amplitude than the signature of the loose part, and may encompass all or part of the same frequency range, it is unlikely that the background noise, which is substantially random, will trigger the neural network discriminating means.

Neural network arrangements for automatic pattern recognition and the like are disclosed, for example, in U.S. Pat. Nos. 5,010,512—Hartstein et al; 5,095,443—Watanabe; and 5,103,496—Andes et al, which are hereby incorporated in their entireties. An array of nodes or neuron cells are interconnected in successive levels such that each of the nodes in a given level is coupled to all of the nodes in the previous level. The respective neurons apply mathematical functions to the inputs from the previous level, and each produces an output as a function of the weighted sum of the inputs to that neuron. The outputs become the inputs to the next level of neurons, and after a number of levels at least one output is generated, representing the likelihood that the initial input represents the pattern that the neural network is intended to recognize. The mathematical functions at the neurons can be as simple as a weighted sum of the inputs (a weighting factor being stored for each input to the neuron), or can be more complex. During a learning cycle, the factors for the respective inputs are adjusted upwardly or downwardly to minimize the error of the final result, thus learning the pattern the network is to recognize.

Inputs to the neural network can represent the amplitude of successive samples over time, frequency information over a frequency range or a selected comb of frequencies, duration of amplitude and/or frequency occurrences, and the like. The neural network can be implemented in hardware, such as according to the above-mentioned patents, or can be implemented using software.

The neural network stores weighting factors in a manner similar to a finite impulse response filter, but includes an array of a plurality of neurons at each level. As the successive samples are processed, the sample information moves through the levels. The weighting factors tend to emphasize those aspects of the signal that resemble the learned pattern. Other aspects that do not resemble the learned pattern are de-emphasized, particularly proceeding through the neural levels. Assuming the result of the overall neural network is a numerical correlation or score factor, the result will vary only slightly until the characteristic signal aspects appear in the input date, then swings widely to indicate the occurrence of the signature aspects, making the signal much more readily detectable than in a threshold system that does not rely on parameter weighting and interrelationship. The output swing can be compared to a threshold, with more dependable results, used to generate an alarm, or otherwise processed.

It is an object of the invention to discriminate accurately for a characteristic sound pattern amid background noise.

It is also an object of the invention reliably to detect a noise signature characteristic of a loose part in a flowpath by defining a series of factors applicable to parameters of the noise signature, and applying the factors to a monitored signal for distinguishing an occurrence of the noise signature.

It is a further object of the invention to establish empirically factors representing a probability that particular acoustic parameters and parameter relationships will occur in an acoustic signal emitted by a conduit during passage of one or more types of loose parts through the conduit, and to monitor the acoustic signal to discriminate for passage of the loose parts.

These and other objects are accomplished in a detector for loose parts moving in a conduit carrying a flowing material, such as the cooling circuit of a pressurized water nuclear reactor, to assist in preventing damage to the conduit or fouling of movable parts. An acoustic pickup produces an electrical signal with vibration of the conduit due to impact from the loose part, the signal including background noise. A signal processor encodes the levels of distinct parameters of the electrical signal such as sampled amplitude, amplitude at particular frequencies, in an ongoing manner, producing discrete outputs representing values of the parameters. These outputs are coupled as inputs to a neural network with physical or logical neuron cells loaded with weighting factors. The factors represent a pattern characteristic of a loose part. Products of the input values and the weighting factors are summed to produce one or more outputs of the neural network, the value of which is compared to a threshold. The sum normally varies randomly, but has a strong swing when the pattern is encountered, due to the factors emphasizing the pattern over background noise. The sum(s) are compared to a threshold and used to operate a display or alarm. The weighting factors are learned by repeating empirical tests and correlating the factors to the signal to minimize error.

BRIEF DESCRIPTION OF THE DRAWINGS

There are shown in the drawings embodiments of the invention as presently preferred. It should be understood that the invention is capable of certain variations from the preferred embodiments and is not intended to be limited thereto. In the drawings.

DETAILED DESCRIPTION OF THE PREFERRED EMBODIMENTS

Figure 1:
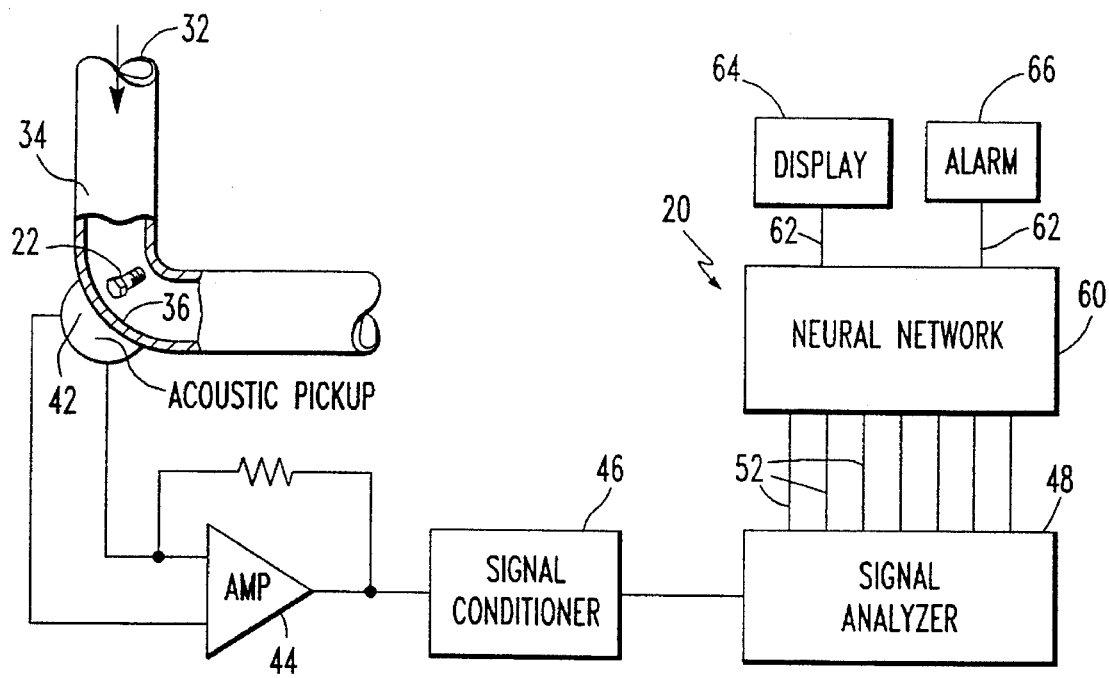
FIG. 1 is a schematic block diagram showing the grouped elements of the diagnostic system responsive to learned audio signatures according to the invention.

Referring to FIG. 1, a diagnostic apparatus 20 is provided for detecting a loose part 22 moving in a conduit 32 carrying a flowing material, in particular the primary coolant circuit of a pressurized water nuclear reactor. The loose part 22, which could be a bolt or the like, passes through the conduit 32 along with the liquid coolant, and can cause damage to the conduit 32 or fouling of movable parts. In moving through the conduit 32 the loose part 22 impacts on sidewalls 34 of the conduit, for example at turns 36 in the conduit as shown, making a noise that is characteristic of the type of loose part involved.

Art acoustic pickup 42 is arranged to sense vibration of the conduit 32, producing an electrical signal in response to vibration of the conduit sidewall 34. The sensed vibration includes the vibration caused by the loose part 22 as well as background vibration. The acoustic pickup 42 can be a simple microphone operable to sense vibration at audible frequencies, mounted in contact with the conduit sidewall 34. Alternatively or in addition, frequencies outside the audible range can be sensed.

The signal produced by a loose part 22 impacting against the conduit results partly from ringing of the conduit 32 and partly from ringing of the part 22. The signal produced by the acoustic pickup 42 has a characteristic pattern or signature that is different for loose parts of different types. The mass, dimensions and energy of impact (inertia) of the loose part 22 affect the sound produced by an impact, and can be distinguished according to the invention. Of course the sound is also different for impacts occurring at different points along the conduit 32, thus requiring the ability to distinguish the sound of a loose part impact near where the sensor 42 is mounted.

Signal processing means including an amplifier 44 and signal conditioner 46 are coupled to the electro-acoustic pickup 42. The signal processing means encode the signal with respect to a plurality of distinct parameters of the electrical signal, producing a value for each such parameter. As shown generally in FIG. 1, an appropriate signal processing means can include a plurality of discrete outputs 52 at which the parameter values of the signal are presented constantly or by sampling in an ongoing manner. The discrete outputs 52 are coupled to a neural network 60 operable to respond to one or more predetermined patterns in the parameter values, and thereby to distinguish for the audio signatures of one or more types of loose part 22. Outputs 62 of the neural network 60 are coupled to display means 64, and preferably to an alarm 66, for alerting the operator in the event a loose part 22 is detected. The loose parts detection system 20 can be provided as an element of an integrated diagnostic system in which loose parts detection is one of many operational aspects of the plant being monitored.

Figure 2:
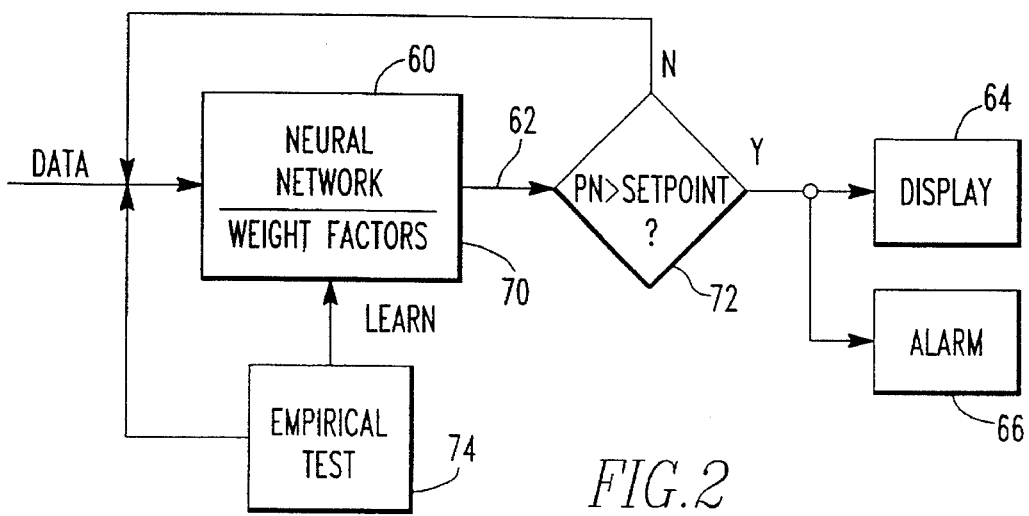
FIG. 2 is a schematic block diagram showing the functional blocks of the invention for learning an audio signature and thereafter for finding the audio signature in a noisy signal.
Figure 3:
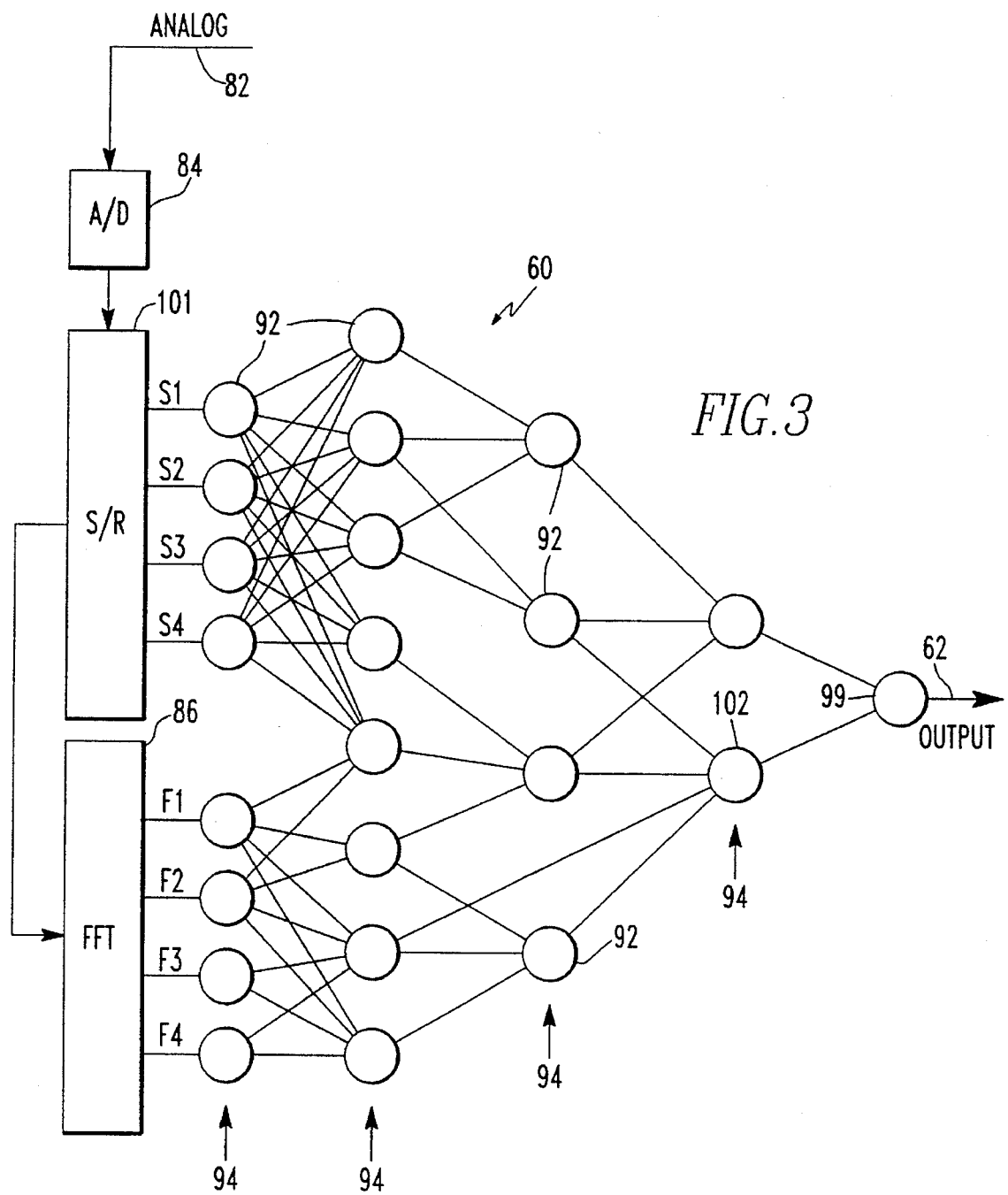
FIG. 3 is a block diagram illustrating the neural arrangement of processing blocks according to the invention.

As shown generally in FIG. 2 and in more detail in FIG. 3, the data values input to the neural network 60 are applied to weighting factors 70 to produce an output 62 reflecting the probability that a detected sound represents a loose part 22 of the type the system 20 is arranged to sense. As shown by decision block 72 in FIG. 2, the output 62 can be compared to a predetermined setpoint for activating the display 62 and/or alarm 66. This comparison can be an analog function or a numerical (digital) function. The predetermined setpoint also can be made variable with conditions, for example to accommodate changes in the level of background noise.

The weighting factors 70 for particular types of loose parts define the characteristics acoustic signal of those parts.

The weighting factors 70 can be chosen by analyzing the acoustic signal produced by particular parts in empirical tests, as shown in FIG. 2 by block 74. Preferably, the loose parts detection system 20 is switchable to a learning mode, wherein the characteristics of the audio signal are monitored over a number of example impacts, the parameters being averaged, correlated and assessed as to standard deviation, in order to select a set of weighting factors having a high probability of representing the signal produced by impact of a loose part 22. Having determined the weighting factors 70, the parameter values of the electrical signal from the acoustic sensor 42 are applied to the weighting factors 70. During the occurrence of background noise, the output of the neural network 60 varies randomly with the noise, and generally maintains a low level. During the occurrence of a loose part impact, however, the weighting factors 70 and the signal parameters correlate. The output 62 of the neural network 60 experiences a wide swing, passing the predetermined setpoint and operating the threshold detection means 72.

Referring to FIG. 3, the analog signal 82 from the acoustic pickup 42, preferably amplified and conditioned, can be sampled and digitized via an analog to digital converter 84, such that one encoded aspect of the signal is amplitude of the signal 82 over a plurality of successive samples. The samples can be processed via a numeric processor 86 as well, for example being encoded as to the amplitude of the signal in particular frequency bands, for example using a fast fourier transform processor operating on a plurality of samples. Alternatively, a series of comb filters (not shown) can be used to selectively encode the energy of the signal in different frequency bands.

In addition to parameter values respecting amplitude and frequency, other parameter values can be generated. For example, individual parameter values can be differentiated, integrated or otherwise processed over a predetermined period (e.g., one or several sampling periods). The sum, difference, product or the like, of two or more particular parameter values can be calculated and used as a processed parameter value. These values are input as discrete inputs to the neural network 60.

In the example shown in FIG. 3, the sample amplitudes and frequencies provide a plurality of data values that are coupled as inputs to the neural network 60. Network 60 is described as "neural" due to its hierarchical arrangement of neural cells 92 in banks 94. Each cell 92 defines at least one operation involving a weighting factor 70 applied in a mathematical and/or logical operation on values coupled to one or more of the inputs of the respective cell 92. For example, the values of the inputs are multiplied by corresponding weighting factors at each neural cell 92, and the products of such multiplication are summed to produce a neural cell output forming a value coupled as an input to a next bank 94 of neural cells 92. The neural network could have only one bank, the outputs of which are summed at a final bank 99. Preferably, however, plural banks are coupled successively. The neural cell outputs for a given bank 94 of cells 92 form inputs for a next bank 94 of cells 92. The cells 92 of this next bank 94 also have stored weighting factors 70 applicable to their respective inputs. Ultimately, the results produced by a final bank 99 of one or more neural cells 92 are summed to produce as the output 62 of the neural network 60 the sum of a final product of the weighting factors and the values from each of the neuron cells. The output thus reflects the correlation of the input parameters to all the proportional weights and/or logical and numerical functions which are defined by the couplings leading from the parameter values 52 to the ultimate neural network output 60.

An example of a possible ranked coupling of neural cells 92 is shown in FIG. 3. Throughout the drawings, the same reference numerals have been used to indicate the same functional elements of the respective embodiments. Referring to FIGS. 1 and 3, the analog signal 82 from the acoustic sensor 42 is digitized as shown in FIG. 3 and applied to a shift register 101 that is shifted synchronously with sampling via A/D converter 84, thus providing output data for a plurality of discrete values 52 on sample lines S1 through S4. A large number of samples can be stored, only four sample lines being shown to simplify the drawing. Coupled to the sample shift register 101 is an additional processing element 86 for generating further parameter values on the basis of numerical operations, a fast fourier transform element being shown for purposes of illustration, producing processed parameter values F1 through F4, which are also used as discrete values 52 representing attributes of the analog signal 82.

The parameter values 52 are applied to a first bank 94 of neural cells 92 and the outputs of the cells in this first bank are applied to a subsequent bank 94. The couplings between each of the banks 94 have associated weights 70 for each of the connections. In the embodiment shown, couplings are provided on the first level of connections between all of the amplitude values 52 and a subset of the neural cells 92 in the initial bank 94, whereby the output of these neural cells 92 can be based on the weighted sum of values 52 in any combinations. The weighting factors 70 may be positive or negative for a parameter that correlates positively or negatively with the occurrence of a loose part impact, respectively. Insofar as a parameter is found to be unrelated to the signal produced by a particular type of loose part 22, the applicable weighting factor can be zero. A zero weighting factor is functionally the same as an arrangement in which no connection is provided between one or more cells 92 in the successive banks 94. In that case, and as shown for example by the connections between the neural cells 92 in banks 94 coupled to parameter values F1 through F4, the outputs of certain of the neural cells 92 are related to only certain ones of the parameter values 52.

The respective coupled banks 94 of neural cells 92, and the weighted factors 70 defining the strength and polarity of couplings between the cells 92, define relationships or correlations of both a logical (i.e., Boolean) and a proportionate nature. It is not absolutely necessary that all the relationships involve connections between successive banks 94. For example as shown by neural cell 102, the output can be the weighted sum of the outputs of cells on the successive bank and the next previous bank (i.e., skipping one of the banks with at least one connection).

The operation of the neural cells 92 can be simultaneous with presentation of data on lines S1–S4 and F1–F4, at least after a propagation delay to allow the output to settle as the results of the weighted sums at previous banks ripple through the neural network 60. Alternatively, the banks 94 can operate synchronously with sampling. In that case, the outputs off each bank 94 are based on the inputs to that bank from the previous sampling period. Although the output 62 of the neural network 60 is thereby delayed compared to the present parameter values by a time period equal to the product of the sampling period and the number of successive banks 94, such an arrangement has the benefit that the discrete values can be compared or correlated over time, using bank skipping connections such as neural cell 102. The output 60 can thus be based on inputs of values from the present sampling period and previous sampling periods. Within the neural network 60, connections operable to feed neural cell outputs forward or backward relative to the sampling periods is thus possible. This capability is provided in addition to the correlation of data in successive samples that is possible in the initial bank 94 due to the advance of data in shift register 101, and is useful for assessing the persistence of a given attribute of the signal or relation of attributes.

The weighting factors 70 complement at least one combination of the distinct parameters 52 that is unique to the audio signature of the loose part 22, and may include factors representing more than one type of loose part 22. Upon passage of the loose part(s) 22, the output of the final neuron 92 or bank 94 is substantially displaced from the level the output assumes during background noise and/or during vibrations caused by impacts of loose parts that do not match the profile or signature built into the weighting factors 70.

Figure 4:
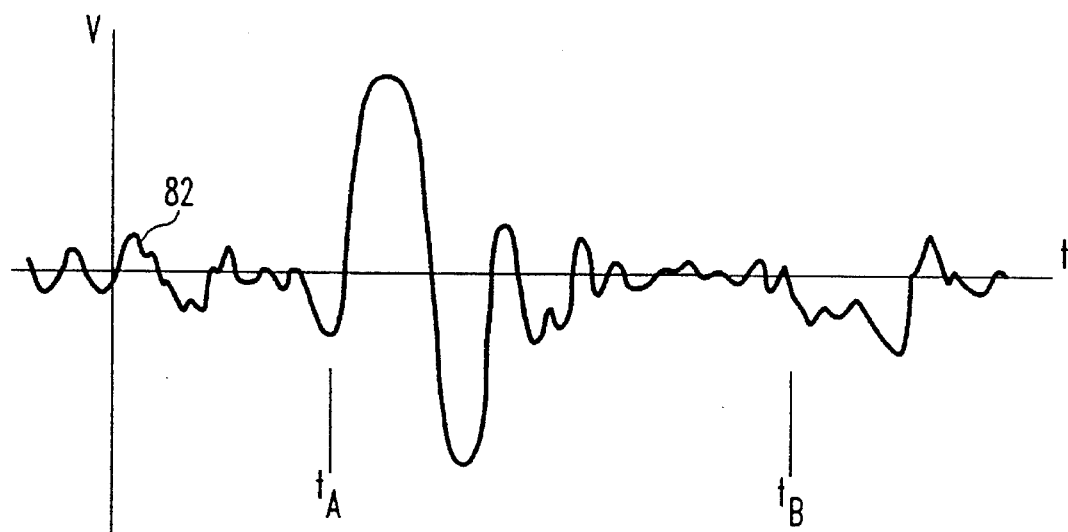
FIG. 4 is a graph of amplitude vs. time, showing an exemplary audio signature.
Figure 5:
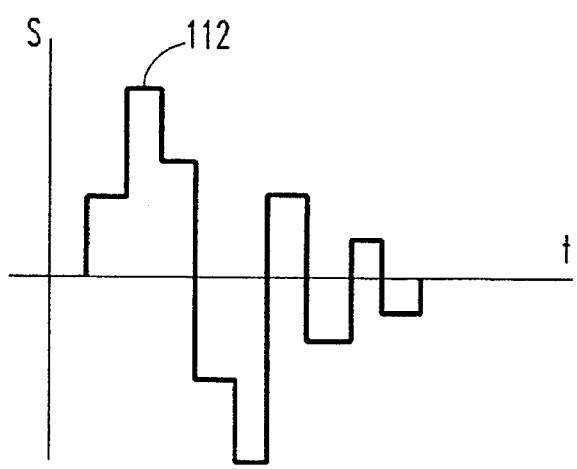
FIG. 5 is a graph of amplitude vs. time, showing the digitization of an idealized audio signature according to FIG. 4.

Operation of the invention can be appreciated with reference to FIGS. 4–7, that show graphs of waveforms. At the simplest, the neural network 60 can detect an amplitude waveform characteristic of the impact of a loose part 22, which as compared to FIG. 3 could be as simple as a one-bank set of weighting cells or neurons 92 coupled to a shift register 101. Assuming the waveform of FIG. 4 is the signal produced by an impact, the weighting factors 70 stored in the neural cells could complement the characteristic signal as shown by the digitized waveform signature 112 shown in FIG. 5. The detected signal of FIG. 4 is sampled and shifted through the shift register 101, and operated upon by weighting factors corresponding to the stored pattern 112 shown in FIG. 5. When the samples are shifted to where they become aligned with the weighting factors that are complementary to the characteristic signature 112, a substantial swing in the output 62 of the neural network 60 occurs, as compared to the output 62 when the characteristic signature 112 is not present in the samples, or when the corresponding samples and weights do not align.

Figure 6:
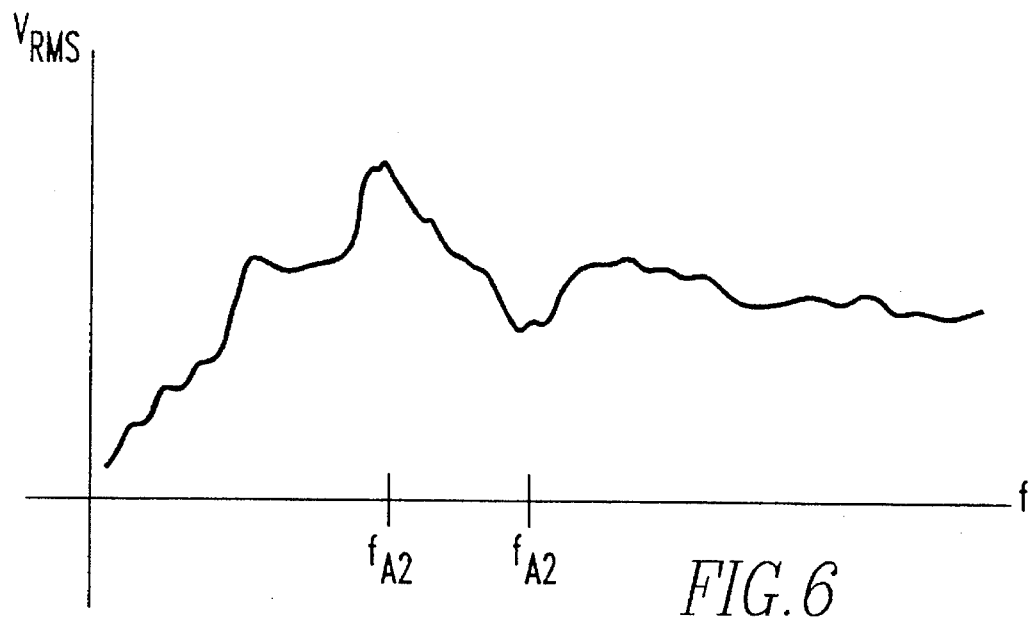
FIGS. 6 and 7 are graphs of RMS amplitude vs. frequency, showing distinct parameters for two different types of loose parts.
Figure 7:
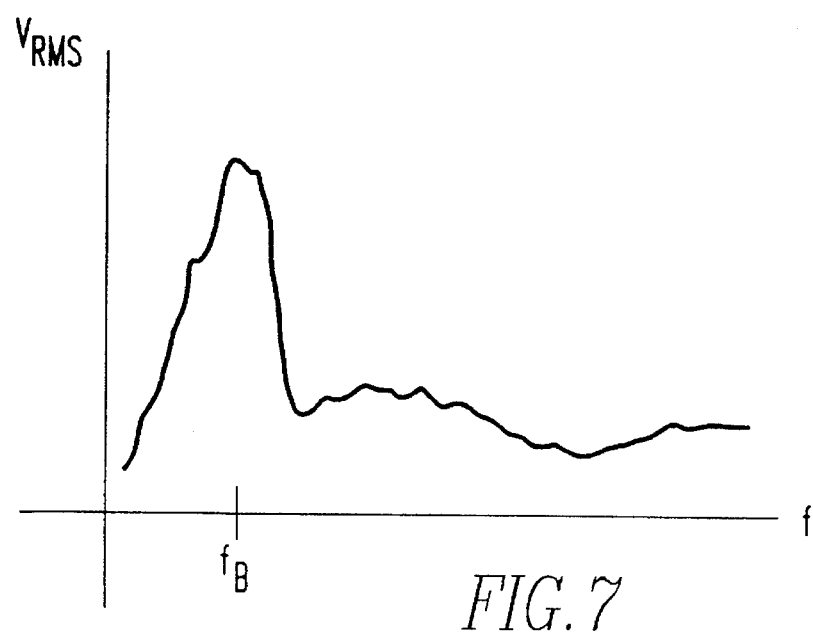

Similarly, as shown in FIGS. 6 and 7, the weighting factors 70 can be based on a numerical construct produced by mathematical operations on the data collected by the acoustic sensor 42. In the example shown, the data is RMS amplitude vs. frequency over a selected range of frequencies. The signature of the impact illustrated in FIG. 6 has a peak at frequency $f_{A1}$ and a valley at frequency $f_{A2}$. Using neural cell weighting factors 70 that favor this relationship and disfavor other relationships, the signature is emphasized in the output 62 by operation of the neural network 60.

A different loose part signature as shown in FIG. 7 has a peak at frequency $f_B$. If such a signal is applied to the weighting factors representing the signature of FIG. 6, the FIG. 7 signal would not produce a large swing in the output 62. To accommodate more than one loose part impact signature subsets of the neural cells can be stored with weighting factors for simultaneously testing for two or more different signatures.

Figure 8:
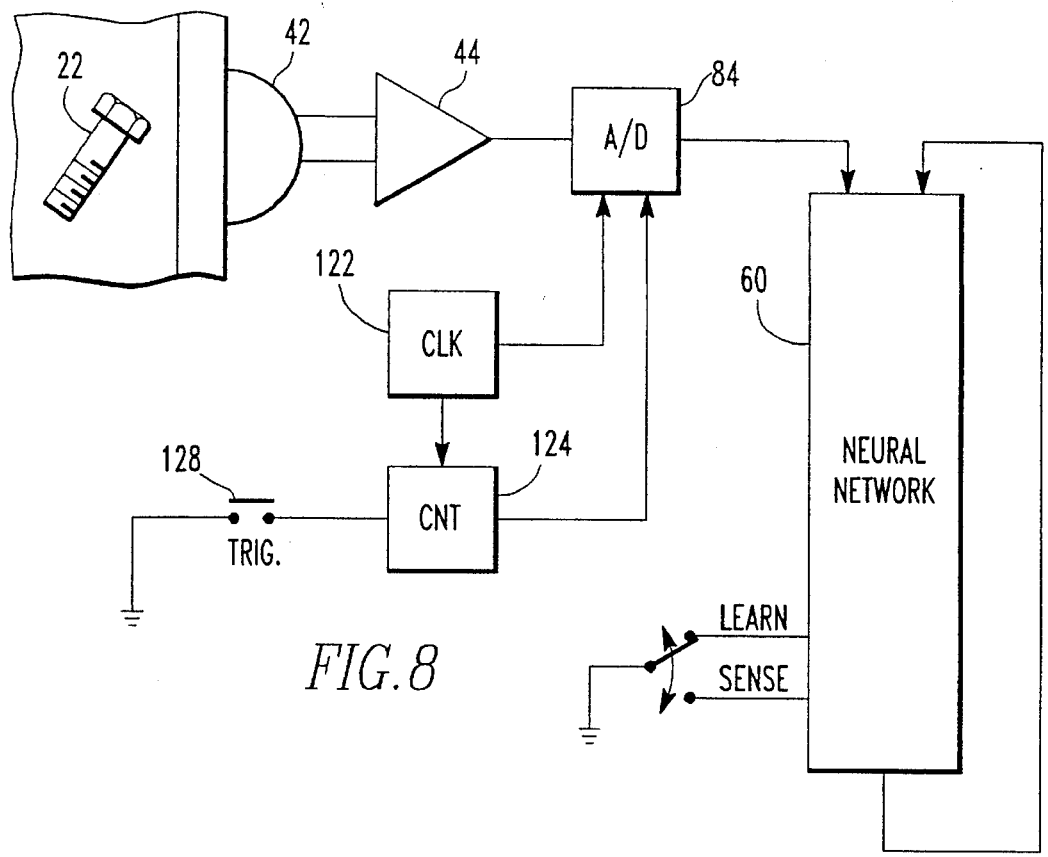
FIG. 8 is a schematic diagram illustrating a means by which an audio signature is learned.

The weighting factors 70 can be determined by analyzing the attributes of signals produced during known impacts of a loose part of a given type, and defining factors representing the signature. The factors are loaded into the neural network 60, which thereafter responds to that type of loose part. Preferably, the system is arranged to assist in analyzing the signal and defining the factors during empirical tests. As shown in FIG. 8, weighting factors characteristic of the loose part impact signature are thereby learned from experience. By operating the acoustic pickup 42 and signal processing means 44, 84 during known impacts of the loose part 22, the weighting factors are accumulated from observed values of the distinct parameters. The weighting factors can be developed by averaging the data values and testing for the repeatability of relationships between the data values. Preferably, such empirical testing is accomplished when the background noise is at a minimum. However, provided the learning function can be triggered upon occurrence of an impact and a sufficient number of test impacts are made to develop statistically significant data, the weighting factors can be developed even in the presence of background noise.

In FIG. 8, the acoustic sensor 42 is coupled to the conduit 32 and the analog signal 82 is amplified and applied to analog to digital converter 84. A/D converter 84 samples the signal 82 at a rate defined by a signal from clock circuit 122. The A/D converter 84 can be triggered to encode a predetermined number of samples following triggering, as counted using counter 124, which is enabled following a trigger signal from a triggering means such as switch 128. In lieu of a switch, it is possible to trigger the counter 124 using a light source-photocell pair (not shown) responsive to loose part 22 breaking a beam, or to trigger the counter 124 when the amplitude of the signal exceeds a predetermined minimum (occurring at the beginning of an impact).

The sample data is processed for amplitude, frequency, differential or integral values, sum, difference, product, etc. The data values are then stored in the neural network 60 as a proposed set of weighting factors corresponding to the signal produced during the impact. The test is then repeated and the results obtained during successive tests are used to correct the weighting factors such that they better approximate the characteristic signature of the loose part 22. For example, the cells 92 in each bank can be provided with weighted connections to all of the discrete values 52 of the samples (and/or numerical construct values). The number of cells 92 in a bank 94 is sufficient to encompass a complete set of different mathematical and/or logical functions or that might represent a correlation between the discrete values 52. The average value of each weighting factor for each cell connection is accumulated for successive sample periods following triggering of a learn cycle. The standard deviation of the values during the successive test can be calculated. For the cells where the weighting factors 70 show high positive or negative correlation, the absolute values of the corresponding weighting factors 70 are increased to emphasize this aspect of the signature. If the correlation is poor (e.g., as shown by a high standard deviation), the respective weighting factors 70 are reduced in absolute value. With successive tests, the weighting factors home in on the values that most nearly represent the signal produced by the loose part 22.

The relationships between the values at each neural cell 92 can be processed for the particular sample periods following initiation of a test. In this manner, changes in the signal over time can be encoded. Where a relationship is determined (e.g., a high probability of a positive or inverse relationship between two values), the relationship is stored in the weighting factors 70 of the neural cells. For subsequent use in monitoring for impacts, however, the beginning of an impact is unclear. Nevertheless, weighting factors generated during the learning phase of operation and stored for the neural cells 92 can monitor for time variations as the samples are shifted either along shift register 101 or through the successive banks 94 of neural cells 92. Thus, after developing a set of weighting factors 70 via successive tests, the weighting factors are useful thereafter for ongoing monitoring of the signal from the acoustic sensor 42 during regular operation of the plant.

Figure 9:
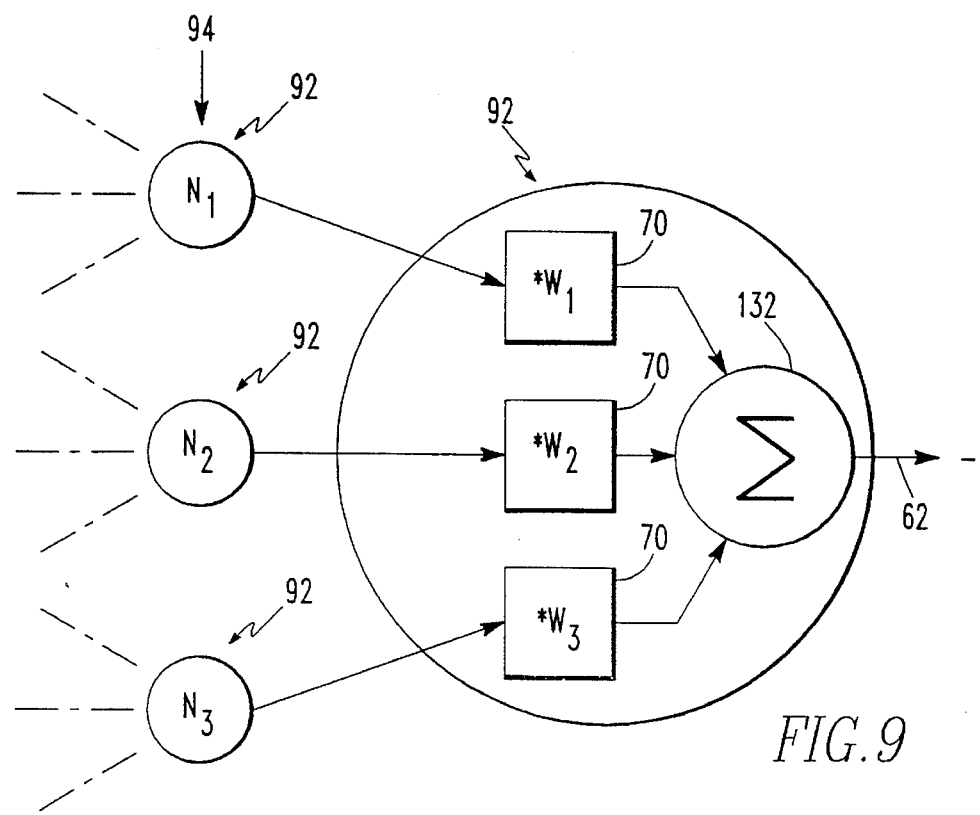
FIG. 9 is a schematic illustration of the function of a single neural cell.

The normal operation of a single neural cell 92 is shown in FIG. 9. The outputs of neural cells $N_1$ to $N_3$ of a previous bank 94 of neural cells are each multiplied by a stored weighting factor $W_1$ to $W_3$, respectively. The products are added at summing junction 132 to form the output of this neural cell, and an input to a next bank 94 of neural cells or to the threshold detection means 72.

When the output of the neural network 60 exceeds a predetermined level, for example detected via the threshold detection means 72 coupled to an output of a final summing cell 132 of the neural network, an output is generated indicating detected passage of a loose part 22 corresponding to the stored signature.

The invention is illustrated with reference to particular connections between neural cells 92 in the successive banks. However, the illustrated connections are merely exemplary. The connections between cells 92 can be more or less extensive, each connection being available to test for another combination of data values or previous neural cell output values. At least a subset of the neural cells 92 on each level 94 are coupled to neural cells 92 on other levels 94, with the output of the upstream subset of cells 92 modifying the output of %he downstream cell The neural network 60 thereby tests the input data for correlation with a stored pattern represented by the neural cell weight factors 70. In a basic configuration, the neural cells 92 are arranged in regular levels proceeding in one direction, from the inputs coupled to the distinct parameter data 52, to an ultimate summing cell at the output 62 of the neural network. Outputs of at least some of the neurons 92 on a higher level 94 also can be coupled as inputs to neurons 92 on a lower level.

The distinct parameters of the electrical signal forming the basis of the neural network inputs include at least a subset of variables chosen from the group consisting of signal amplitude, signal amplitude over at least one discrete frequency range, duration of signal amplitude over time, concentration of energy in at least one discrete frequency range, integration of signal amplitude, differentiation of signal amplitude, sum and/or difference functions, logical functions, and simultaneous occurrence of predetermined conditions in two or more of said variables.

The invention concerns both the method and apparatus for detecting passage of a loose part 22 moving in a conduit 32 carrying a flowing material, specifically the primary coolant conduit of a pressurized water nuclear reactor. Accordingly, the method includes collecting an acoustic signal from vibration of the conduit 32 caused by the loose part 22 and by background vibration, and processing the acoustic signal to encode a plurality of values representing distinct parameters of the acoustic signal, the processing including determining levels of the distinct parameters for at least a subset of the variables described above. The levels of the distinct parameters are operated upon using weighting factors 70 representing characteristic aspects of vibration of the loose part. The weighting preferably defines relationships between the parameters in successive levels, i.e., sets of relatively higher and relatively lower levels of at least two of the distinct parameters defining a pattern characteristic of vibration of the loose part 22. The weighted levels and the weighted relationships contribute to a sum, and the result is compared to a threshold to discriminate for passage of the loose part 22. Whereas the factors for weighting the values and the relationships are chosen to complement an acoustic signal pattern characteristic of the loose part 22, the method highlights the occurrence of a signal characteristic of the loose part even over substantial background noise as is typical of plant operation. The weighting factors 70 are preferably obtained by learning the factors during empirical testing, i.e., by accumulating the factors for weighting the values and the relationships, automatically or manually while observing known impacts of the loose part 22.

The invention having been disclosed, variations and alternatives within the scope and spirit of the invention will now be apparent to persons skilled in the art. The invention is intended to encompass not only the preferred example specifically mentioned above, but also a reasonable range of variations and equivalents. Accordingly, reference should be made to the appended claims rather than the foregoing examples in order to assess the scope of the invention in which exclusive rights are claimed.

I claim:

1. A diagnostic apparatus for detecting a loose part moving in a conduit carrying a flowing material, comprising:

an acoustic pickup operable to produce an electrical signal in response to vibration of the conduit, including vibration caused by the loose part and background vibration;

a signal processing means coupled to the electrical signal of the acoustic pickup, the signal processing means being operable to encode a plurality of values representing distinct parameters of the electrical signal, in an ongoing manner, the signal processing means providing a plurality of discrete outputs representing values of the distinct parameters;

a neural network having a plurality of neuron cells, each defining at least one weighting factor, the neuron cells having inputs coupled to the values of the distinct parameters and being operable to weight the values of the distinct parameters to produce a neuron cell output; and, at least one summing cell producing a sum of a product of the weighting factors and the values from each of the neuron cells, and wherein the weighting factors complement at least one combination of the distinct parameters defining a signature of the loose part, whereby upon passage of the loose part the summing cell produces an output that is substantially displaced from a level resulting from the background noise.

2. The diagnostic apparatus according to claim 1, further comprising means for loading the weighting factors by operating the acoustic pickup and signal processing means during known passages of the loose part, and accumulating the weighting factors from observed values of the distinct parameters.

3. The diagnostic apparatus according to claim 2, further comprising a threshold detection means coupled to an output of the summing cell, the threshold detection means producing an output for indicating passage of the loose part when the output of the summing cell exceeds a predetermined value.

4. The diagnostic apparatus according to claim 1, wherein at least certain of the neuron cells are coupled to at least one other of the neuron cells, and wherein an output of at least one of said certain of the neuron cells modifies an output of said at least one other of the neuron cells.

5. The diagnostic apparatus according to claim 4, wherein the neuron cells are arranged in levels proceeding from inputs coupled to the values of the distinct parameters, to the summing cell, and wherein outputs of at least some of the neurons on a higher level are coupled as inputs to neurons on a lower level.

6. The diagnostic apparatus according to claim 5, further comprising means for loading the weighting factors by operating the acoustic pickup and signal processing means during known passages of the loose part, and accumulating the weighting factors from observed values of the distinct parameters.

7. The diagnostic apparatus according to claim 6, wherein the distinct parameters of the electrical signal include at least a subset of variables chosen from the group consisting of signal amplitude, signal amplitude over at least one discrete frequency range, duration of signal amplitude over time, concentration of energy in at least one discrete frequency range, integration of signal amplitude, differentiation of signal amplitude, sum and/or difference functions, logical functions, and simultaneous occurrence of predetermined conditions in two or more of said variables.

8. The diagnostic apparatus according to claim 7, further comprising a threshold detection means coupled to an output of the summing cell, the threshold detection means producing an output for indicating passage of the loose part when the output of the summing cell exceeds a predetermined value.

9. The diagnostic apparatus according to claim 8, comprising a plurality of networks of said neurons, coupled to the values of the distinct parameters, each of the plurality of networks defining weighting factors representing at least one of distinct aspects of vibration of the loose part, and distinct aspects of vibration of loose parts of different types.

10. The diagnostic apparatus according to claim 9, further comprising a summing cell for each of the networks, and means for discriminating for passage of loose parts from outputs of said summing cells.

11. A method for detecting passage of a loose part moving in a conduit carrying a flowing material, comprising:

collecting an acoustic signal from vibration of the conduit caused by the loose part and by background vibration;

processing the acoustic signal to encode a plurality of values representing distinct parameters of the acoustic signal, said processing including determining levels of the distinct parameters for at least a subset of variables chosen from the group consisting of signal amplitude, signal amplitude over at least one discrete frequency range, duration of signal amplitude over time, concentration of energy in at least one discrete frequency range, integration of signal amplitude, differentiation of signal amplitude, sum and difference functions, logical functions, and simultaneous occurrence of predetermined conditions in at least two of said variables;

weighting the values of the distinct parameters by weighting factors representing characteristic aspects of vibration of the loose part;

weighting relationships between the values of the distinct parameters as a function of relatively higher and relatively lower levels of at least two of the distinct parameters defining a pattern characteristic of vibration of the loose part;

summing the weighted levels and the weighted relationships, and comparing a sum thereof to a threshold to discriminate for passage of the loose part, factors for weighting the values and the relationships being chosen to complement an acoustic signal pattern characteristic of the loose part.

12. The method according to claim 11, further comprising accumulating the factors for weighting the values and the relationships by observing known passages of the loose part.

* * * * *